(12) United States Patent
Chang et al.

(10) Patent No.: US 10,213,758 B2
(45) Date of Patent: Feb. 26, 2019

(54) POLYMER AND DISPERSION

(71) Applicant: INDUSTRIAL TECHNOLOGY RESEARCH INSTITUTE, Hsinchu (TW)

(72) Inventors: Cha-Wen Chang, Zhongpu Township (TW); Ching-Mao Huang, New Taipei (TW); Shinn-Jen Chang, Hsinchu (TW); Yu-Hui Chen, Taipei (TW); Wan-Jung Teng, Xinfeng Township (TW); Shu-Ya Tsai, Hsinchu (TW); Jen-Yu Chen, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 8 days.

(21) Appl. No.: 15/339,398

(22) Filed: Oct. 31, 2016

(65) Prior Publication Data

US 2017/0128899 A1 May 11, 2017

(30) Foreign Application Priority Data

Nov. 5, 2015 (TW) .............................. 104136454 A

(51) Int. Cl.
*B01F 17/00* (2006.01)
*C08G 73/24* (2006.01)
*C08G 73/02* (2006.01)

(52) U.S. Cl.
CPC ........ *B01F 17/005* (2013.01); *B01F 17/0007* (2013.01); *C08G 73/024* (2013.01)

(58) Field of Classification Search
CPC .. B01F 17/005; B01F 17/0007; C08G 73/024; C09K 3/00
(Continued)

(56) References Cited

U.S. PATENT DOCUMENTS

2011/0011208 A1   1/2011  Lin et al.

FOREIGN PATENT DOCUMENTS

| CN | 101460576 A | 6/2009 |
| CN | 101595136 A | 12/2009 |

(Continued)

OTHER PUBLICATIONS

Jiang et al. "Amphiphilic Zwitterionic Poly(dimethylsiloxane) (PDMS)-contained Poly(Ether amine) (Z-SiPEA) as the Responsive Polymeric Dispersant". Published Apr. 11, 2011. Applied Materials & Interfaces. pp. 1749-1756. Total pp. 8.*
(Continued)

*Primary Examiner* — Harold Y Pyon
*Assistant Examiner* — Danny N Kang

(74) *Attorney, Agent, or Firm* — Birch, Stewart, Kolasch & Birch, LLP

(57) ABSTRACT

A polymer is disclosed, which includes a structure of Formula 1 or Formula 2.

(Formula 1)

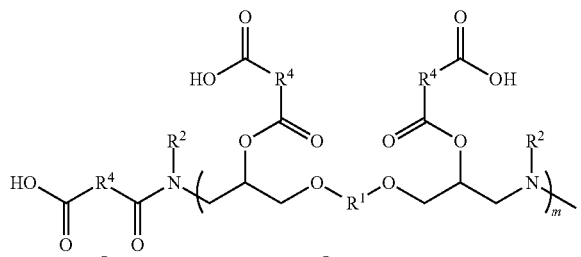

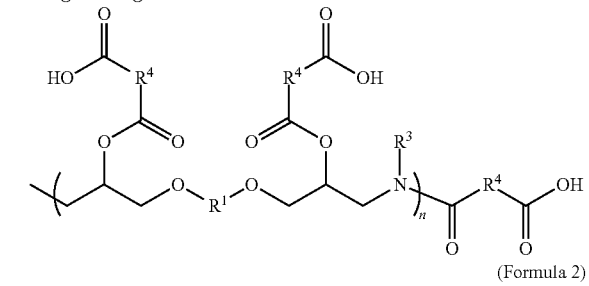

(Formula 2)

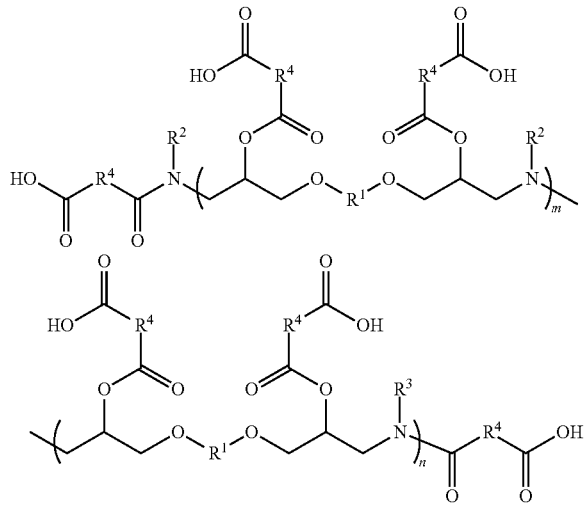

$R^1$ is a $C_{2-18}$ alkylene group or a $C_{6-18}$ arylene group, $R^2$ is a $C_{1-18}$ alkyl group, and $R^3$ is a functional group of Formula 3.

(Formula 3)

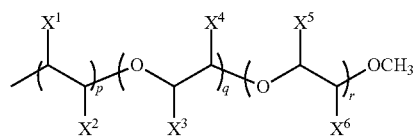

Each of $X^1$, $X^2$, $X^3$, $X^4$, $X^5$, and $X^6$, being the same or different, is H or methyl. Each of p, q, and r, being the same or different, is an integer of 1 to 60. $R^4$ is —$C_2H_4$—, —$C_3H_6$—, (Continued)

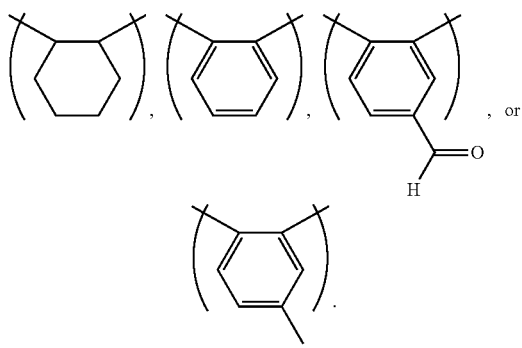

Each of m and n, being the same or different, is an integer of 0 to 50, and m+n≠0.

9 Claims, No Drawings

(58) Field of Classification Search
USPC .......................................................... 252/500
See application file for complete search history.

(56) References Cited

FOREIGN PATENT DOCUMENTS

| CN | 102652146 A | 8/2012 |
|---|---|---|
| CN | 103608703 A | 2/2014 |
| CN | 102272252 B | 5/2014 |
| CN | 103911024 A | 7/2014 |
| CN | 104744693 A | 7/2015 |
| JP | 2008143994 A * | 6/2008 |
| JP | 2011-195694 A | 10/2011 |
| TW | 201024329 A1 | 7/2010 |
| TW | I361812 B | 4/2012 |
| TW | I461491 B | 11/2014 |
| TW | I492965 B | 7/2015 |
| WO | WO 2005/113677 A1 | 12/2005 |

OTHER PUBLICATIONS

Chunfeng Di et al., "Multi-responsive polymer nanoparticles from the amphiphilic poly(dimethylsiloxane) (PDMS)-containing poly(ether amine) (PDMS-gPEA) and its potential application for smart separation", Journal of Materials Chemistry, 2011, vol. 21, pp. 4416-4423.

Chunfeng Di et al., "Multistimuli Responsive Micelles Based on Well-Defined Amphiphilic Comb Poly(ether amine) (acPEA)", Journal of Polymer Science: Part A: Polymer Chemistry, 2010, vol. 48, pp. 3468-3475.

Dorota Neugebauer, "Graft copolymers with poly(ethylene oxide) segments", Polymer International, 2007, vol. 56, pp. 1469-1498.

Office action dated Apr. 7, 2016 for the corresponding TW application 104136454.

Qianping Ran et al., "Adsorption Mechanism of Comb Polymer Dispersants at the Cement/Water Interface", Journal of Dispersion Science and Technology, 2010, vol. 31, pp. 790-798.

Robert J. Flatt et al., "Conformation of Adsorbed Comb Copolymer Dispersants", Langmuir, 2009, vol. 25, pp. 845-855.

Rui Wang et al., "Multistimuli Responsive Organosilica Hybrid Nanoparticles Based on Poly(ether amine)", Macromolecules, 2010, vol. 43, pp. 10628-10635.

Shuangcheng Tang et al., "Facile aqueous-phase synthesis of multi-responsive nanogels based on polyetheramines and bisepoxide", Journal of Materials Chemistry B, 2013, vol. 1, pp. 1628-1634.

Xuesong Jiang et al., "Amphiphilic Zwitterionic Poly(dimethylsiloxane) (PDMS)-Contained Poly(Ether amine) (Z-SiPEA) as the Responsive Polymeric Disperant", ACS Applied Materials & Interfaces, 2011, vol. 3, pp. 1749-1756.

Yanrong Ren et al., "Multistimuli Responsive Grafted Poly(ether tert-amine) (gPEA): Synthesis, Characterization and Controlled Morphology in Aqueous Solution", Journal of Polymer Science: Part A: Polymer Chemistry, 2009, vol. 47, pp. 6353-6361.

Yanrong Ren et al., "Poly(ether tert-amine): A Novel Family of Multiresponsive Polymer", Journal of Polymer Science: Part A: Polymer Chemistry, 2009, vol. 47, pp. 1292-1297.

Chinese Office Action for Appl. No. 201510931466.8 dated May 25, 2018.

* cited by examiner

POLYMER AND DISPERSION

CROSS REFERENCE TO RELATED APPLICATIONS

The present application is based on, and claims priority from, Taiwan Application Serial Number 104136454, filed on Nov. 5, 2015, the disclosure of which is hereby incorporated by reference herein in its entirety.

TECHNICAL FIELD

The technical field relates to a dispersant.

BACKGROUND

In a dispersion of metal powder, the metal powder aggregates easily due to its cohesive force, and subsides easily due to its high density. As such, it is difficult to stabilize the dispersion of the metal powder. When the metal powder is utilized in a conductive paste, the proportions of metal powder, organic dispersant, and additive will influence the conductivity of a conductive coating formed of the conductive paste. Moreover, if the metal powder is utilized in low-viscosity (e.g. 4-20 cps at 25° C.) inkjet ink, the dispersant will play a critical role in overcoming the subsidence of the metal powder due to gravity, in which the metal powder is well dispersed in order to achieve high dispersing stability and high conductivity. However, there is no specific dispersant and related product for conductive metal powders, and the metal powders of various sizes (from the micrometer scale to the nanometer scale) require dispersants of different molecular sizes.

Accordingly, dispersants for matching the metal powders of various sizes are called for.

SUMMARY

One embodiment of the disclosure provides a polymer, having a structure of Formula 1 or Formula 2:

wherein $R^1$ is a $C_{2-18}$ alkylene group or a $C_{6-18}$ arylene group, $R^2$ is a $C_{1-18}$ alkyl group, and $R^3$ is a functional group of Formula 3:

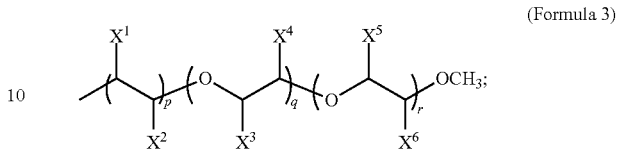
(Formula 3)

each of $X^1$, $X^2$, $X^3$, $X^4$, $X^5$, and $X^6$, being the same or different, is H or methyl; each of p, q, and r, being the same or different, is an integer of 1 to 60; $R^4$ is $-C_2H_4-$, $-C_3H_6-$,

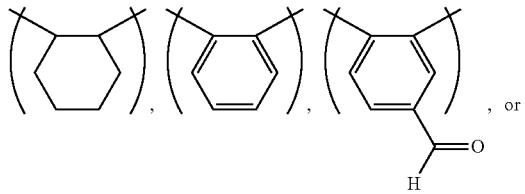, or

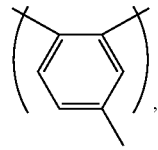, each of m and n, being the same or different, is an integer of 0 to 50, and m+n≠0.

One embodiment of the disclosure provides a dispersion, comprising: 100 parts by weight of powder; 1 to 80 parts by

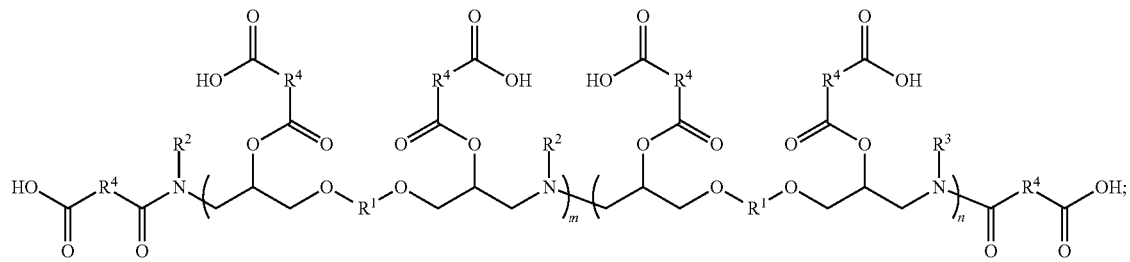
(Formula 1)

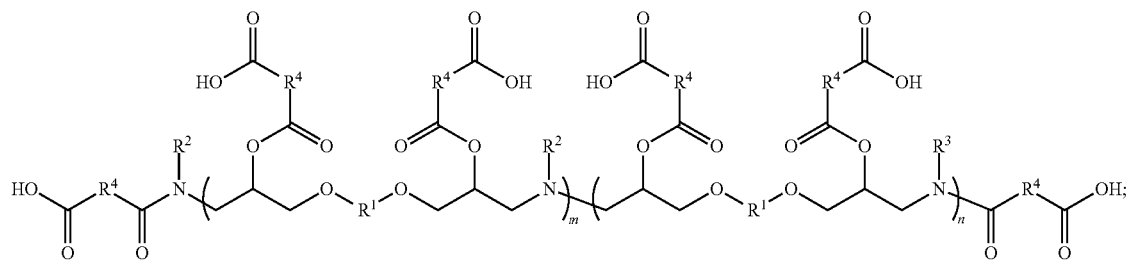
(Formula 2)

weight of a dispersant, wherein the dispersant is the described polymer; and 100 to 900 parts by weight of solvent.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

One embodiment of the disclosure provides a polymer, having a structure of Formula 1 or Formula 2.

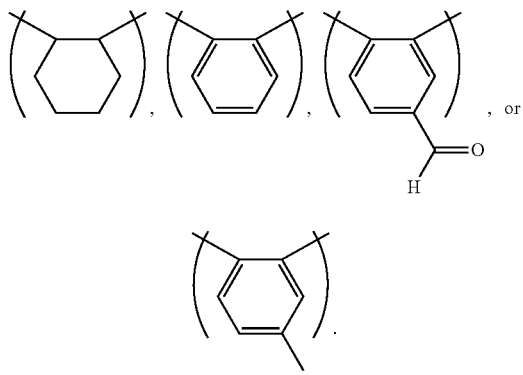

Each of m and n, being the same or different, is an integer of 0 to 50, and m+n≠0.

In one embodiment, the polymer is synthesized as described below. Note that the synthesis method described is only for illustration purposes, and the disclosure should not

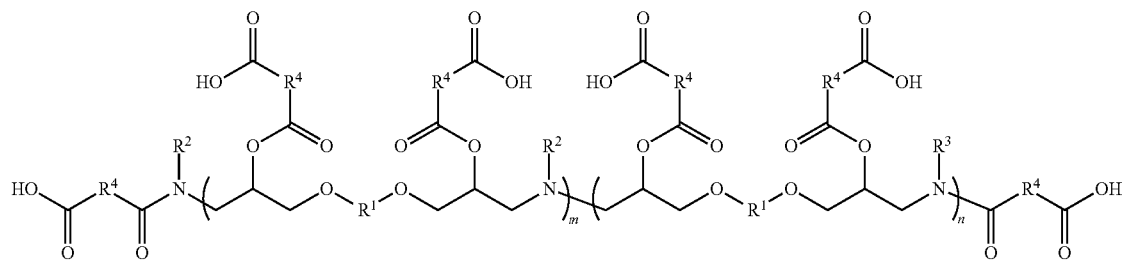

(Formula 1)

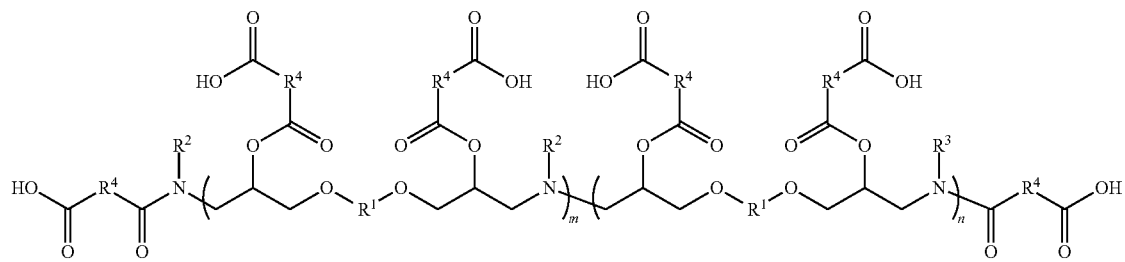

(Formula 2)

In Formulae 1 and 2, $R^1$ is a $C_{2-18}$ alkylene group or a $C_{6-18}$ arylene group, $R^2$ is a $C_{1-18}$ alkyl group, and $R^3$ is a functional group of Formula 3.

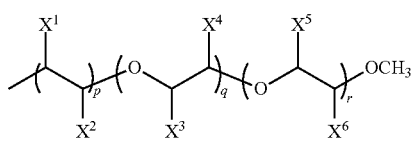

(Formula 3)

In Formula 3, each of $X^1$, $X^2$, $X^3$, $X^4$, $X^5$, and $X^6$, being the same or different, is H or methyl. Each of p, q, and r, being the same or different, is an integer of 1 to 60. $R^4$ is —$C_2H_4$—, —$C_3H_6$—, be limited thereto. One skilled in the art may select appropriate steps to synthesize the polymer in Formula 1 or 2 on the basis of his/her laboratory equipments and chemical resources. First, epoxy resin is charged in a reaction bottle to be stirred and heated to 110° C. to 160° C. The epoxy resin is easily condensed on the reaction bottle wall due to an overly high temperature, such that an epoxy resin ration in the following reaction will not be a predetermined epoxy resin ratio of original calculation. The epoxy resin cannot be melted to liquid form due to an overly low temperature, such that the ring-opening reaction is not easily performed, the polymerization degree is too low, and the molecular weight distribution is not average. Subsequently, $R^2$—$NH_2$ and $R^3$—$NH_2$ are slowly added into the reaction bottle. After the addition of $R^2$—$NH_2$ and $R^3$—$NH_2$ is completed, the mixture is then heated to 110° C. to 160° C. to be reacted for 1 to 6 hours. The equivalent ratio of the (a) epoxy resin to (b) $R^2$—$NH_2$ and $R^3$—$NH_2$ (e.g. (a)/(b)) is controlled to be less than 1 for obtaining a polymer. The color of the polymer may change to brown at an overly high reaction temperature and/or for an overly long reaction period due to deterioration. The reaction is not easily completed at an overly low reaction temperature and/or for an overly short reaction period, such that the molecular weight of the reaction product is too low. The reaction is shown in Formula 4. $R^1$, $R^2$, $R^3$, m, and n in Formula 4 are similar to those defined above, and the values of m and n is determined by the amounts of $R^2$—$NH_2$ and $R^3$—$NH_2$.

(Formula 4)

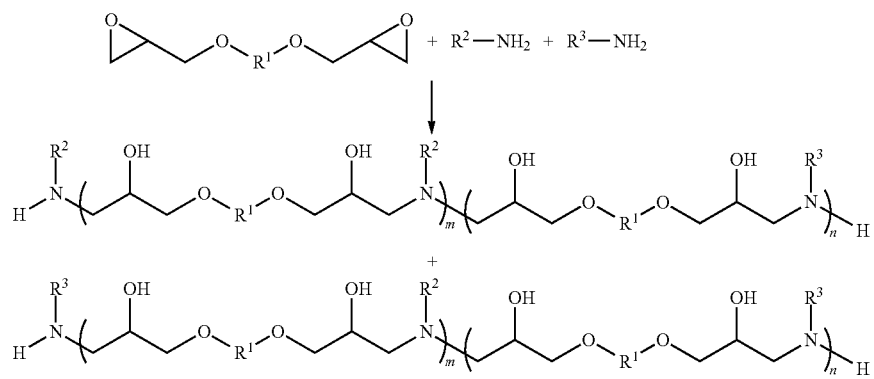

Cyclic anhydride is then added into the reaction bottle, and the mixture is reacted at 110° C. to 160° C. for 10 to 16 hours to obtain the product of Formulae 1 and 2. Intramolecular crosslink or intermolecular crosslink may occur at an overly high reaction temperature and/or for an overly long reaction period, thereby obtaining a gel product. The reaction is not easily completed to residue the cyclic anhydride at an overly low reaction temperature and/or an overly short reaction period. The reaction is shown in Formula 5. $R^1$, $R^2$, $R^3$, $R^4$, m, and n in Formula 5 are similar to those defined above (Formula 5)

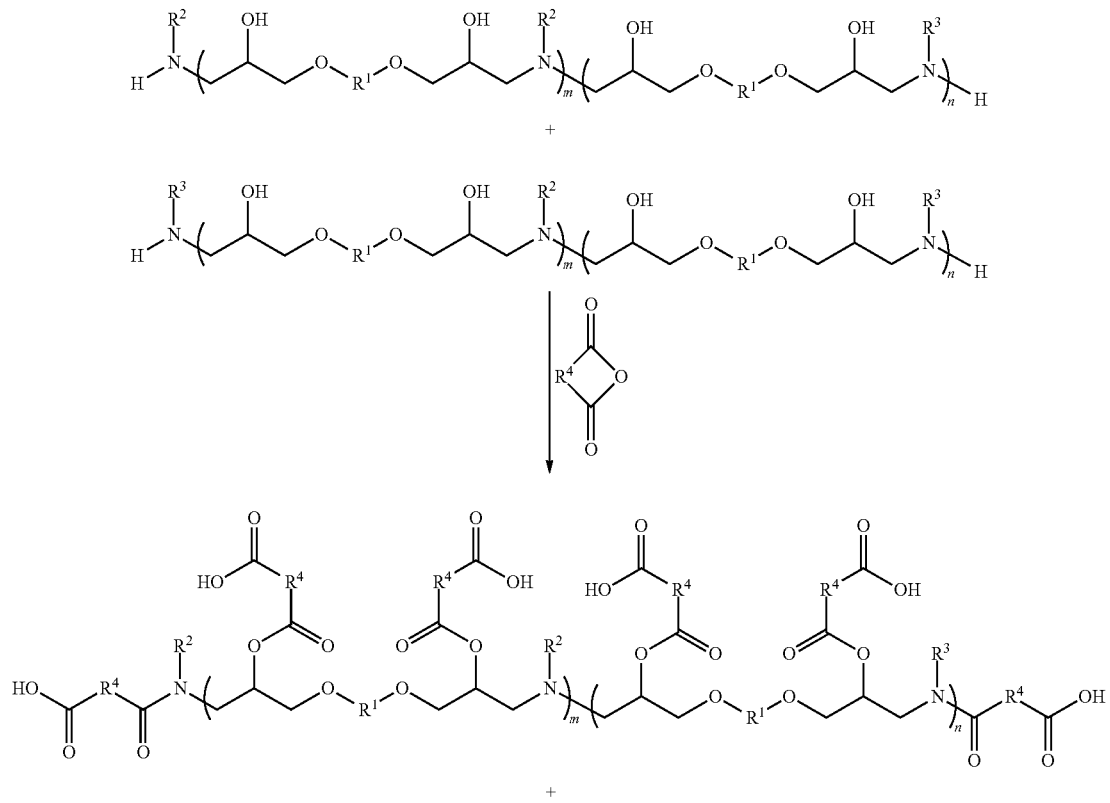

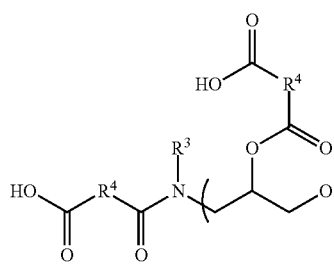 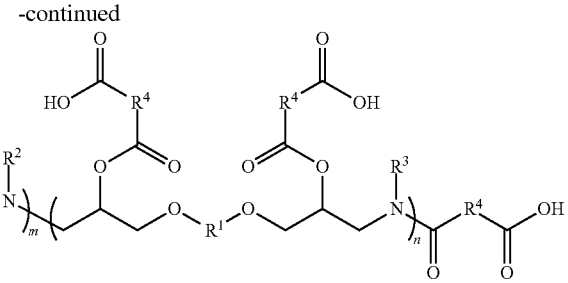

In one embodiment, the epoxy resin can be 1,6-hexanediol diglycidyl ether, bisphenol A epoxy resin, or poly(ethylene glycol) diglycidyl ether. In one embodiment, $R^1$ is hexylene group and $R^2$ is octyl group. In one embodiment, the $R^3$—$NH_2$ is Jeffamine® L100, in which $X^1$ is $CH_3$, $X^2$ is H, $X^3$ is $CH_3$, $X^4$ is H, $X^5$ is H, $X^6$ is H, p=1, q=3, and r=19. In one embodiment, the $R^3$—$NH_2$ is Jeffamine® L200, in which $X^1$ is $CH_3$, $X^2$ is H, $X^3$ is $CH_3$, $X^4$ is H, $X^5$ is H, $X^6$ is H, p=1, q=2, and r=42. In one embodiment, the $R^3$—$NH_2$ is Jeffamine® L300, in which $X^1$ is $CH_3$, $X^2$ is H, $X^3$ is $CH_3$, $X^4$ is H, $X^5$ is H, $X^6$ is H, p=1, q=8, and r=58. In one embodiment, m is an integer of 1 to 50, and n is an integer of 1 to 50.

The first order amine $R^3$—$NH_2$ can be a long-chain copolymer of ethylene glycol and isopropylene glycol, which may serve as a solvent-phile terminal of the polymer, and its molecular length is determined by the polymerization degree of the ethylene glycol and the isopropylene glycol. The distance between the lyophilic terminals can be controlled by the molecular weight of the epoxy resin. The carboxylic acid groups of the polymer may serve as anchoring groups, which can chelate metal. Appropriate molecular length of the lyophilic terminals and appropriate distance between the lyophilic terminals can be selected on the basis of the metal powder size, thereby lowering the dispersant amount for stably dispersing the metal powders. As such, the conductivity of a metal film formed from the dispersion can be further enhanced. It should be understood that if the metal powder is not dispersed well in the dispersion, the metal powder will aggregate into balls, and it will be difficult to form a uniform metal film on a substrate using the dispersion. As a result, the conductivity of the metal film will be reduced. In one embodiment, the polymers in Formulae 1 and 2 are random copolymers.

In one embodiment, 100 parts by weight of powder, 1 to 80 parts by weight of the dispersant (The polymer in Formula 1 and/or the polymer in Formula 2), and 100 to 900 parts by weight of a solvent can be mixed to form a dispersion. Too much dispersant may reduce the conductivity of the film formed from the dispersion. Too little dispersant cannot stabilize the dispersion, and the conductive powder of the dispersion easily subsides. In one embodiment, the powder includes metal, metal oxide, inorganic pigment, or organic pigment. The metal can be silver, copper, gold, aluminum, or platinum. The metal oxide can be titanium dioxide, iron oxide, zinc oxide, aluminum oxide, or zirconium oxide. The inorganic pigment can be yellow inorganic pigment such as cadmium yellow (PY35, C.I. 77205, CAS#12237-67-1), titanium nickel yellow (PY53, C.I.77788, CAS#8007-18-9), praseodymium zirconium yellow (PY159, C.I.77997, CAS#68187-15-5), chromium titanium yellow (PY162, C.I.77896, CAS#68611-42-7; PY163, C.I.77897, CAS#68186-92-5), or bismuth yellow (PY184, C.I.771740, CAS#14059-33-7); magenta inorganic pigment such as iron red (PR101, C.I.77491, CAS#1317-60-8), cadmium red (PR108, C.I.77202, CAS#58339-34-7), lead chromium red (PR104, C.I.77605, CAS#12656-85-8; PR105, C.I.77578, CAS#1314-41-6), or iron zirconium red (PR232, C.I.77996, CAS#68412-79-3); cyan inorganic pigment such as cobalt blue (PB28, C.I.77364, CAS#68187-40-6) or cobalt chromium blue (PB36, C.I.77343, CAS#68187-11-1); black inorganic pigment such as manganese iron black (PBK26, C.I.77494, CAS#68186-94-7; PBK33, C.I.77537, CAS #75864-23-2), cobalt iron chromium black (PBK27, C.I.77502, CAS#68186-97-0), copper chromium black (PBK28, C.I.77428, CAS#68186-91-4), chromium iron black (PBK30, C.I.77504, CAS#71631-15-7), or titanium black (PBK35, C.I.77890, CAS#70248-09-8); white inorganic pigment such as titanium white (PW6, C.I.77891, CAS#13463-67-7), zirconium white (PW12, C.I.77990, CAS#1314-23-4), or zinc white (PW4, C.I.77947, CAS#1314-13-2); orange inorganic powder such as cadmium orange (P020, C.I.77199, CAS#12656-57-4) or orange chromium yellow (P021, C.I.77601, CAS#1344-38-3); or green inorganic pigment such as chromium green (PG17, C.I.77288, CAS#1308-38-9), cobalt green (PG19, C.I.77335, CAS#8011-87-8), cobalt chromium green (PG26, C.I.77344, CAS#68187-49-5), or cobalt titanium green (PG50, C.I.77377, CAS#68186-85-6). In one embodiment, the organic pigment is Blue5200 or Black9600 commercially available from BestChem International Co., Ltd. The solvent can be water, glycol ether such as ether alcohol such as diethylene glycol diethyl ether, diethylene glycol dimethyl ether, propylene glycol monomethyl ether acetate, diethylene glycol butyl ether acetate, ethylene butyl ether, tetraethylene glycol dimethyl ether, or a combination thereof. In one embodiment, the powder has a diameter of 20 nm to 10 μm.

In one embodiment, the powder in the dispersion is metal such as silver (Ag). The powder may have a diameter of 20 nm to 10 μm, such as 20 nm to 100 nm. The dispersion is applied on the substrate and then baked at 60° C. to 180° C. to remove the solvent in the dispersion. As such, a conductive pattern is formed. The dispersion is so-called conductive paste. Because the dispersant of the disclosure will not greatly influence the conductivity of the final conductive pattern, it is not necessary to remove the dispersant in a high temperature process. Therefore, the dispersion can be applied on a substrate with low thermal resistance (e.g. plastic) for further utilization in a flexible electronic device.

In one embodiment, the powder in the dispersion is an inorganic pigment, such as glass pigment. The glass pigments include a black inorganic pigment such as copper chromium black (CAS#68186-91-4), a magenta inorganic pigment such as cadmium red (CAS#58339-34-7), a yellow inorganic pigment such as cadmium yellow (CAS#8007-18-9), a cyan inorganic pigment such as cobalt blue (CAS#68187-40-6), or a white inorganic pigment such as titanium white (CAS#13463-67-7). The dispersion is applied on the substrate and then baked at 40° C. to 90° C. to remove the solvent in the dispersion. As such, a pattern is formed.

In one embodiment, the powder in the dispersion is an organic pigment, such as Blue5200 or Black9600 commercially available from BestChem International Co., Ltd. The dispersion is applied on the substrate and then baked at 40° C. to 90° C. to remove the solvent in the dispersion. As such, a pattern is formed.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1-1

A reaction bottle was flushed with nitrogen. 65.13 g of Jeffamine® L-200 (32.56 mmole, commercially available from Huntsman), 10 g of 1,6-hexanediol diglycidyl ether (43.42 mmole, commercially available from Chang Chun Chemical CO., LTD.), and 4.21 g of octylamine (32.56 mmole, commercially available from Aldrich) were then put into the reaction bottle, mechanically stirred, and heated to 140° C. to be reacted for 4 hours. The reaction is shown in Formula 6.

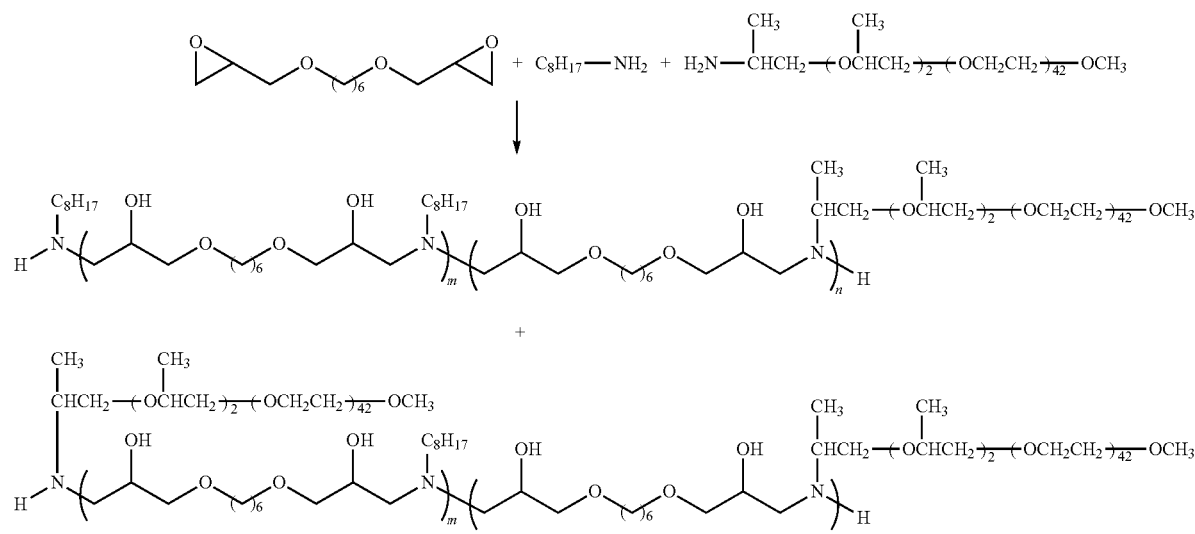

(Formula 6)

The mixture was then cooled to 80° C., 13.04 g of succinic anhydride (130.26 mmole) was added into the reaction bottle. The mixture was then reacted at 80° C. for 12 hours, and then heated to 130° C. to be further reacted for 3 hours, thereby obtaining a comb-like polymer (yield=99%, yellow liquid). The reactants such as 1,6-hexanediol diglycidyl ether, octylamine, Jeffamine® L-200, and succinic anhydride had a molar ratio of 4:3:3:12. The reaction is shown in Formula 7.

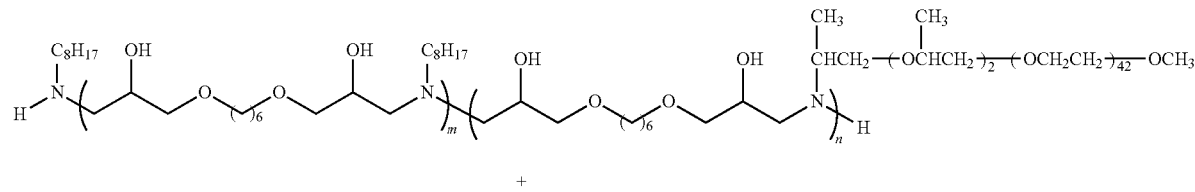

(Formula 7)

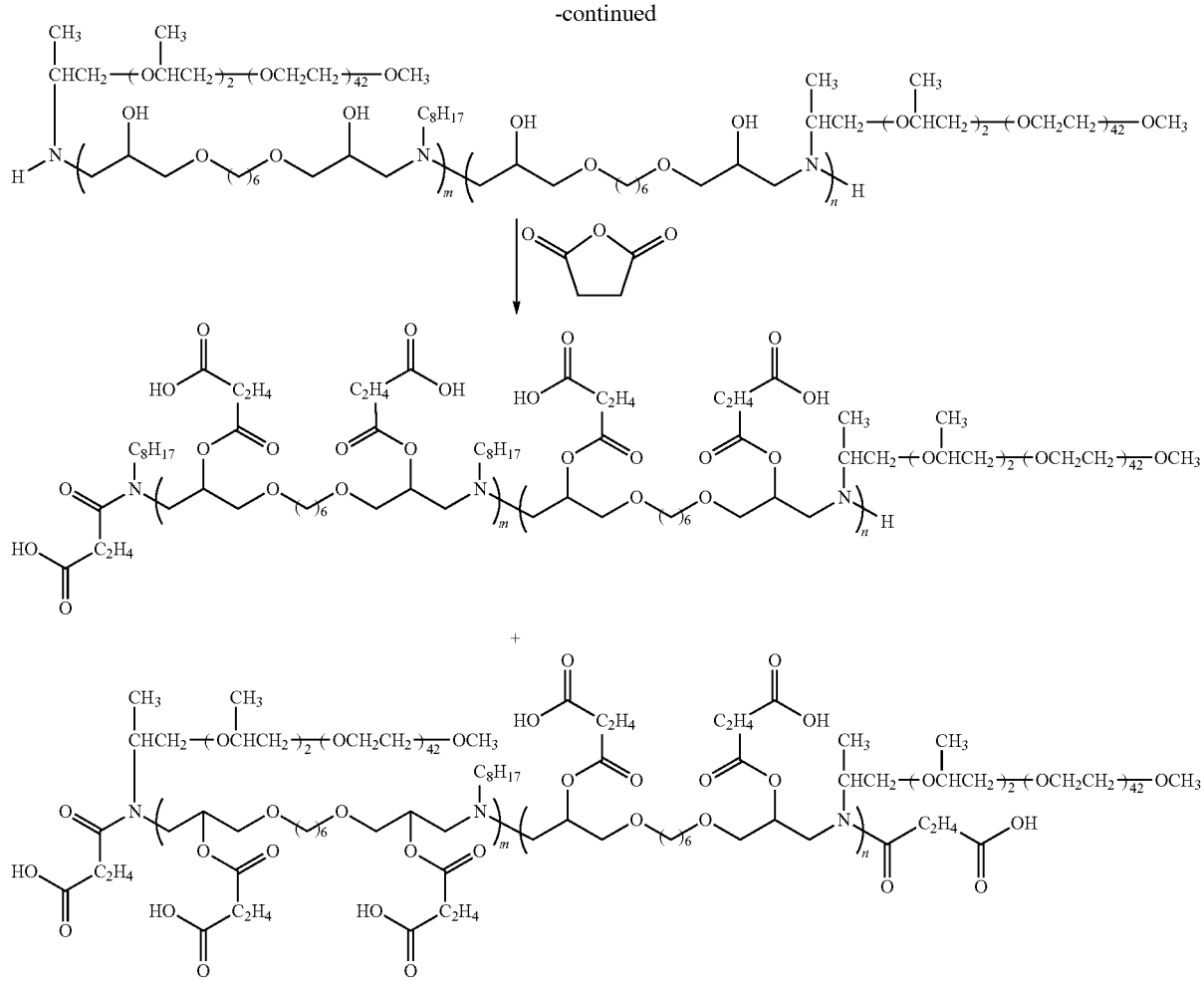

The products in Formula 7 were analyzed by ¹H NMR, ¹³C NMR, and IR, and the related spectra thereof are listed below: ¹H NMR (DMSO-d₆, δ, ppm): 0.84 (t), 1.02 (d), 1.08 (d), 1.24 (d), 1.46 (s), 2.40 (s), 2.44 (s), 3.22 (s), 3.31~3.68 (m), 4.97 (d), 12.03 (s). ¹³C NMR (DMSO-d₆, δ, ppm): 14.1, 17.4, 22.2, 25.6, 28.9, 29.3, 58.2, 69.8~74.4 (m), 173.7 (C=O). IR (KBr): 3539 cm⁻¹ (acid O—H stretch), 2910, 2874 cm⁻¹ (alkyl C—H stretch), 1728 cm⁻¹ (ester stretch), 1642 cm⁻¹ (C=O stretch), 1106 cm⁻¹ (C—O—C stretch). Mw: 6100, and Mn: 5800.

Example 1-2

Example 1-2 was similar to Example 1-1, and the difference in Example 1-2 was the R³—NH₂ being changed from Jeffamine® L-200 to Jeffamine® L-100 (Formula 8).

(Formula 8)
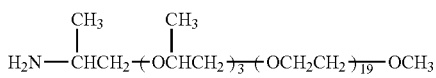

The products in Example 1-2 were analyzed by ¹H NMR, ¹³C NMR, and IR, and the related spectra thereof are listed below: ¹H NMR (DMSO-d₆, δ, ppm): 0.84 (t), 1.02 (m), 1.18 (d), 1.22 (b), 1.46 (s), 2.40 (s), 2.45 (s), 3.23 (s), 3.40~3.50 (m), 4.97 (d), 12.05 (s). ¹³C NMR (DMSO-d₆, d, ppm): 14.1, 17.2, 22.3, 25.6, 28.8, 28.9, 29.3, 31.4, 58.2, 69.8~70.7 (m), 71.5, 74.4, 173.7 (C=O). IR (KBr): 3469 cm⁻¹ (acid O—H stretch), 2921, 2870 cm⁻¹ (alkyl C—H stretch), 1730 cm⁻¹ (ester stretch), 1640 cm⁻¹ (C=O stretch)), 1104 cm⁻¹ (C—O—C stretch).

Example 1-3

Example 1-3 was similar to Example 1-1, and the difference in Example 1-3 was the R³—NH₂ being changed from Jeffamine® L-200 to Jeffamine® L-300 (Formula 9).

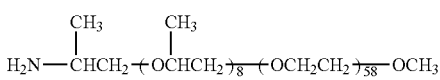

The products in Example 1-3 were analyzed by ¹H NMR, ¹³C NMR, and IR, and the related spectra thereof are listed below: ¹H NMR (DMSO-d₆, δ, ppm): 0.84 (t), 1.02 (d), 1.11 (d), 1.23 (b), 1.47 (s), 2.40 (s), 3.23 (s), 3.32 (s), 3.36~3.54 (m), 5.07 (d), 11.86 (s). ¹³C NMR (DMSO-d₆, δ, ppm): 14.1, 17.3, 22.3, 28.2, 28.8, 28.9, 29.3, 31.4, 58.2, 67.9, 69.8~70.3 (m), 71.5, 74.3, 74.4, 173.8 (C=O). IR (KBr): 3510 cm⁻¹

(acid O—H stretch), 2910, 2870 cm$^{-1}$ (alkyl C—H stretch), 1730 cm$^{-1}$ (ester stretch), 1640 cm$^{-1}$ (C=O stretch), 1110 cm$^{-1}$ (C—O—C stretch).

Example 1-4

Example 1-4 was similar to Example 1-1, and the difference in Example 1-4 was the molar ratio of 1,6-hexanediol diglycidyl ether, octylamine, Jeffamine® L-200, and succinic anhydride being changed to 1:1:1:4. The products in Example 1-4 were similar to the products in Formula 7.

Example 1-5

Example 1-5 was similar to Example 1-1, and the difference in Example 1-5 was the molar ratio of 1,6-hexanediol diglycidyl ether, octylamine, Jeffamine® L-200, and succinic anhydride being changed to 3:2:2:8. The products in Example 1-5 were similar to the products in Formula 7.

Example 1-6

Example 1-6 was similar to Example 1-1, and the differences in Example 1-6 were that the reactants were free of octylamine and succinic anhydride, the Jeffamine® L-200 was replaced with Jeffamine® L-300, and 1,6-hexanediol diglycidyl ether and Jeffamine® L-300 had a molar ratio of 3:4. The product in Example 1-6 is shown in Formula 10.

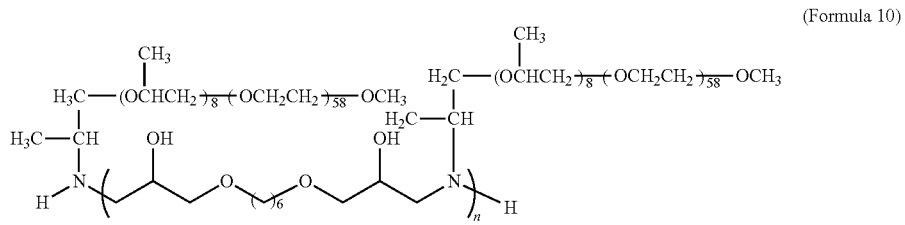

(Formula 10)

Example 2

Different weight ratios of the dispersant (the comb-like polymer, the product of Formula 7 in Example 1-1) and nano silver powder (diameter=60 nm) were added into diethylene glycol monoethyl ether, and dispersed by sonication, thereby preparing nano silver dispersions with a nano silver content of 40 wt %, as shown in Table 1.

TABLE 1

| Properties | Serial No. | | | | | | | |
| --- | --- | --- | --- | --- | --- | --- | --- | --- |
| | 2-1 | 2-2 | 2-3 | 2-4 | 2-5 | 2-6 | 2-7 | 2-8 |
| Dispersant/Ag (weight ratio) | 1/80 | 1/40 | 1/20 | 1/13 | 1/10 | 1/6.7 | 1/5 | 1/4 |
| Average diameter of dispersed Ag powder ($D_{ave}$, nm) | 197 | 122 | 68 | 67 | 72 | 68 | 72 | 66 |
| Maximum diameter of 90% Ag powder ($D_{90}$, nm) | 720 | 345 | 238 | 178 | 173 | 186 | 173 | 203 |
| $D_{90}/D_{ave}$ | 3.7 | 2.8 | 3.5 | 2.7 | 2.4 | 2.7 | 2.4 | 3.1 |
| Viscosity (cp) | 7.0 | 6.4 | 6.5 | 7.9 | 9.3 | 14.0 | 20.1 | 24.7 |
| Density (g/mL) | 1.51 | 1.53 | 1.52 | 1.54 | 1.55 | 1.55 | 1.54 | 1.54 |
| Density change ratio after being centrifuged at 500 rpm for 15 minutes (%) | 16% | 25% | 4% | 4% | 5% | 4% | 2% | 2% |
| Volume resistivity of the film after being formed and then baked at 170° C. for 30 minutes ($\mu\Omega \cdot cm$) | 26 | 36 | 24 | | | $>10^9$ | | |

As shown above, the dispersant/silver powder with a weight ratio of 1/20 in Example 2-3 was the most suitable ratio for dispersing the silver powder with a diameter of 60 nm, which might simultaneously consider the conductivity of the film from the dispersion and the dispersity of the dispersion.

2 parts by weight of a dispersant (such as commercially available dispersant BYK2070 or the product in Example 1-4) and 40 parts by weight of a nano silver powder (diameter=60 nm) were added into diethylene glycol monoethyl ether, and then dispersed by sonication, thereby preparing two dispersions with a nano silver content of 40 wt %. The dispersions were coated and then baked at 170° C. for 30 minutes to form silver films with a thickness of 10 μm. The conductivities of the silver films are shown in Table 2. Obviously, the comb-like polymer (The product in Formula 7) exhibits a better dispersing effect for the silver powder than that of the commercially available dispersant and the product in Example 1-4. Accordingly, the dispersant should be appropriately designed to have the excellent dispersing effect for improving the conductivity of the film from the dispersion.

TABLE 2

| Dispersant | Silver powder content | Dispersant content | Dispersant/silver powder (weight ratio) | Volume resistivity (μΩ · cm) 170° C./30 min |
|---|---|---|---|---|
| Product in Formula 7 | 40 wt % | 2 wt % | 0.05 | 15 |
| BYK2070 | 40 wt % | 2 wt % | 0.05 | 34000 |
| Product in Example 1-4 | 40 wt % | 2 wt % | 0.05 | 199100 |

Example 3

1 part by weight of the product in Example 1-5 (the comb-like polymer) serving as the dispersant and 2 parts by weight of aqueous organic blue pigment (Blue432, solid content≥25%, commercially available from BestChem International Co., Ltd.) were ground at 2300 to 2500 rpm to form a dispersion, and the properties of the dispersion are shown in Table 3.

1 part by weight of the product in Example 1-5 (the comb-like polymer) serving as the dispersant and 2 parts by weight of aqueous organic black pigment (Black9600, solid content≥25%, commercially available from BestChem International Co., Ltd.) were ground at 2300 to 2500 rpm to form a dispersion, and the properties of the dispersion are shown in Table 3.

1 part by weight of the product in Example 1-6 (the comb-like polymer) serving as the dispersant and 2 parts by weight of aqueous organic blue pigment (Blue432, solid content≥25%, commercially available from BestChem International Co., Ltd.) were ground at 2300 to 2500 rpm to form a dispersion, and the properties of the dispersion are shown in Table 3.

1 part by weight of the product in Example 1-6 (the comb-like polymer) serving as the dispersant and 2 parts by weight of aqueous organic black pigment (Black9600, solid content≥25%, commercially available from BestChem International Co., Ltd.) were ground at 2300 to 2500 rpm to form a dispersion, and the properties of the dispersion are shown in Table 3. As shown in Table 3, the comb-like polymer without further reacting with the succinic anhydride (e.g. the product of Example 1-6) could not efficiently disperse all types of aqueous organic pigments.

TABLE 3

| | Dispersion of aqueous organic blue pigment | | | | | Dispersion of aqueous organic black pigment | | | | |
|---|---|---|---|---|---|---|---|---|---|---|
| Dispersant | Diameter (nm) | Viscosity (cps) | ΔD (nm)[a] | Δη (cps)[b] | Appearance | Diameter (nm) | Viscosity (cps) | ΔD (nm)[a] | Δη (cps)[b] | Appearance |
| Product of Example 1-5 | 182.4 | 9.08 | −17.7 | 2.02 | Fluid | 138.4 | 45.2 | −0.1 | −4.5 | Fluid |
| Product of Example 1-6 | Gel | Gel | — | — | Gel | 126.4 | 81.7 | −12.1 | −18.8 | Fluid |

[a]The diameter change at 60° C. after 7 days (nm)
[b]The viscosity change at 60° C. after 7 days (cps)

Example 4

1 part by weight of the product in Example 1-5 (the comb-like polymer) serving as the dispersant and 5 parts by weight of organic solvent type black pigment (solid content=20% in a solvent of triethylene glycol dimethyl ether, commercially available from Rainbow Pigment CO., LTD.) were mixed and then dispersed by a DAS LAU vibrator at degree two for 120 minutes to form a dispersion, and the properties of the dispersion are shown in Table 4. As shown in Table 4, the comb-like polymer could efficiently disperse the organic solvent type black pigment.

TABLE 4

| | Organic solvent type black pigment | | | | |
|---|---|---|---|---|---|
| Dispersant | Diameter (nm) | Viscosity (cps) | ΔD (nm)[a] | Δη (cps)[b] | Appearance |
| Product of Example 1-5 | 132.5 | 17.4 | −11.7 | −1.9 | Fluid |

[a]The diameter change at 60° C. after 7 days (nm)
[b]The viscosity change at 60° C. after 7 days (cps)

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:
1. A polymer consisting of a structure of Formula 1 or Formula 2:

(Formula 1)

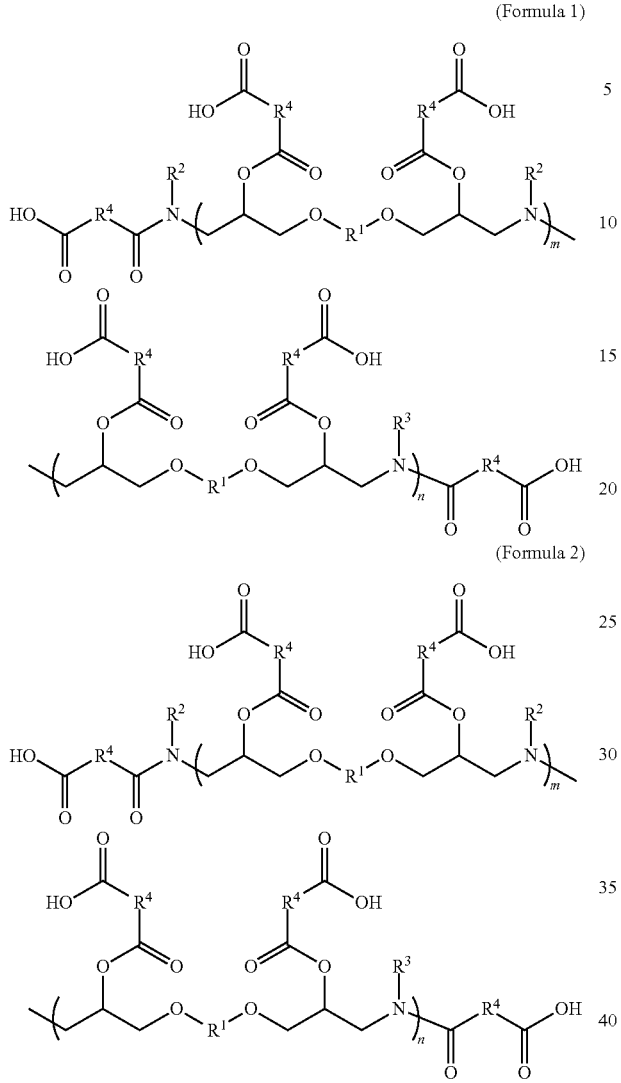

(Formula 2)

wherein $R^1$ is a $C_{2-18}$ alkylene group or a $C_{6-18}$ arylene group, $R^2$ is a $C_{1-18}$ alkyl group, and $R^3$ is a functional group of Formula 3:

(Formula 3)

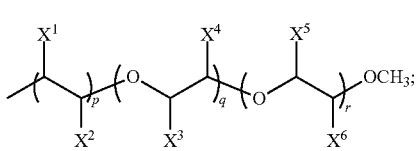

each of $X^1$, $X^2$, $X^3$, $X^4$, $X^5$, and $X^6$, being the same or different, is H or methyl;

each of p, q, and r, being the same or different, is an integer of 1 to 60;

$R^4$ is $-C_2H_4-$, $-C_3H_6-$,

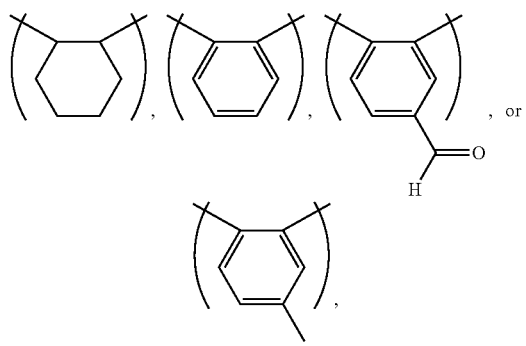

each of m and n, being the same or different, is an integer of 0 to 50, and $m+n \neq 0$.

2. The polymer as claimed in claim 1, wherein:
$R^1$ is hexylene group;
$R^2$ is octyl group;
$X^1$ is $CH_3$, $X^2$ is H, $X^3$ is $CH_3$, $X^4$ is H, $X^5$ is H, and $X^6$ is H;
p=1, q=3, and r=19.

3. The polymer as claimed in claim 1, wherein:
$R^1$ is hexylene group;
$R^2$ is octyl group;
$X^1$ is $CH_3$, $X^2$ is H, $X^3$ is $CH_3$, $X^4$ is H, $X^5$ is H, and $X^6$ is H;
p=1, q=2, and r=42.

4. The polymer as claimed in claim 1, wherein:
$R^1$ is hexylene group;
$R^2$ is octyl group;
$X^1$ is $CH_3$, $X^2$ is H, $X^3$ is $CH_3$, $X^4$ is H, $X^5$ is H, and $X^6$ is H;
p=1, q=8, and r=58.

5. The polymer as claimed in claim 1, serving as a dispersant of a powder.

6. A dispersion, comprising:
100 parts by weight of powder;
1 to 80 parts by weight of a dispersant, wherein the dispersant is the polymer as claimed in claim 1; and
100 to 900 parts by weight of solvent.

7. The dispersion as claimed in claim 6, wherein the powder comprises metal, metal oxide, inorganic pigment, or organic pigment.

8. The dispersion as claimed in claim 6, wherein the solvent comprises water, diethylene glycol diethyl ether, diethylene glycol dimethyl ether, propylene glycol monomethyl ether acetate, diethylene glycol butyl ether acetate, ethylene butyl ether, tetraethylene glycol dimethyl ether, or a combination thereof.

9. The dispersion as claimed in claim 6, wherein the powder has a diameter of 20 nm to 10 μm.

* * * * *